Patented Jan. 1, 1952

2,580,622

UNITED STATES PATENT OFFICE 2,580,622

STORAGE AND CONCENTRATION OF ACETYLENE

Richard R. Vogt and William H. Hamill, South Bend, Ind., assignors to E. I. du Pont de Nemours & Company, Wilmington, Del., a corporation of Delaware No Drawing. Application October 18, 1945, Serial No. 623,188

10 Claims. (Cl. 183—115)

1

This invention relates to the storage and concentration of acetylene.

Because of the very low boiling point and thermal instability of acetylene, its storage has presented a difficult problem. It is known that, when acetylene is compressed in the absence of a diluent, it becomes more violently explosive, and therefore it has been the practice to store and transport it only when dissolved in a suitable solvent. Certain liquids such as acetone have been found to dissolve much larger volumes of acetylene at any given pressure and temperature than would normally be dissolved in accordance with Raoult's law, and are therefore more suitable for the absorption and storage of acetylene than the usual solvents or liquids which dissolve gases only in accordance with Raoult's law. While acetone is the solvent commonly employed commercially for the absorption of acetylene, it is quite highly volatile and therefore is carried off in considerable quantities in the gas stream when the acetylene is liberated, with the result that there is considerable waste of acetone if the acetylene is burned, and, when the acetylene is being used for other purposes where the presence of the volatilized acetone is undesirable, it is necessary to remove the acetone by scrubbing the acetylene gas with various substances such as a sodium bisulfite solution. This purification of the acetylene from acetone therefore entails considerable loss of acetone, the use of additional chemicals for its removal, and the equipment and time required in obtaining the acetylene in its orginal pure form.

In order for a solvent to be entirely satisfactory for use as a storage solvent for acetylene, it should be one that is not too expensive and readily available in large quantities, and, in addition, it should be stable in storage and have a high capacity for dissolving acetylene, yet have a relatively low volatility so that the acetylene can be withdrawn therefrom with a minimum quantity of the solvent itself being volatilized. The lower the volatility of the solvent, the smaller will be the solvent loss, and, where the acetylene must be re-obtained from the solvent in a pure form, the volatilized solvent should be readily removable from the acetylene gas.

In view of the various processes which have been proposed for making acetylene by pyrolysis (with an electric arc or otherwise) of hydrocarbons, still further problems have been introduced with regard to the concentration of the acetylene gas from the dilute gas mixtures resulting from pyrolysis. During the pyrolysis, other gases such as hydrogen, ethylene and ethane are produced as by-products with the acetylene, and the use of selective solvents for separating the acetylene from this mixture has been proposed; see, for instance, Metzger United States Patent 1,900,655, Curme United States Patent 1,422,182, Scott and Harris United States Patent 2,146,448 and Wulff United States Patent 1,906,035.

In the selective absorption of acetylene, the ideal solvent should possess the properties illustrated above for the storage solvent, and, in addition, it should have a high degree of selectivity for acetylene over the other gases present in the mixture, for, upon the selectivity and capacity of the solvent for acetylene, will depend the efficiency of such solvent separation process.

A still further problem with regard to acetylene absorption has become important in the removal of small amounts of contaminating acetylenic compounds from other gases, such as, for example, in the manufacture of butadiene by pyrolysis of butane or other hydrocarbons, wherein small amounts of acetylenic compounds are formed as by-products. While the nature of these compounds is not fully known, it is generally considered that they are the ethyl acetylene (butyne) and/or monovinyl acetylene. Before the butadiene-1,3 is suitable for polymerization to synthetic rubbers, the amount of contaminating acetylenic compounds present must be reduced to a very low level. Again, in the removal of these acetylenic compounds, the use of a selective solvent, having a high capacity for acetylene or acetylenic compounds and which has the properties of the solvents above enumerated and which would be desirable for absorption of acetylene, is desirable for this purpose.

It is therefore an object of this invention to provide a process for the storage and absorption of acetylene in organic solvents which show a selective solvent action for acetylene, which dissolve it in large volumes and which solvents have low volatility whereby the acetylene can be recovered therefrom with a minimum of contamination from the solvent.

We have found that the lower alkyl phosphorus compounds of the class consisting of alkyl phosphates, alkyl phosphites and alkyl phosphine oxides exhibit remarkably good solvent action for acetylene and acetylenic compounds, and, since they have relatively low volatility, and in addition show a selective solvent action for acetylene or acetylenic compounds over their solvent action for hydrogen, ethylene and methane and ethane, they are particularly suitable for use in the concentration and storage of acetylene and for separation of acetylenic compounds from gases normally occurring in the formation of such acetylenic compounds.

The following table shows the solubility of acetylene in the various solvents of this class at 760 mm. in cc. (calculated to 25° C. and 760 mm.) per gram of solvent:

TABLE I

| Solvent | 15° | 20° | 25° | 30° | 35° |
|---|---|---|---|---|---|
| Trimethyl phosphate | 23.78 | 20.98 | 18.33 | | |
| Triethyl phosphate | 28.53 | 25.10 | 22.02 | | |
| Tri-n-propyl phosphate | 22.73 | 19.77 | 17.05 | | |
| Tri-n-butyl phosphate | 20.03 | 17.73 | 15.74 | | |
| Triethyl phosphite | 18.14 | 15.43 | 13.33 | | |
| Tri-n-butyl phosphite | 11.33 | 9.91 | 8.63 | | |
| Tri-n-propyl phosphine oxide | | | 36.55 | 32.0 | 28.07 |

The remarkable suitability of triethyl phosphate, for example, for the separation of acetylene from arc gases is shown by the fact that, although triethyl phosphate dissolves within 4% of the amount of ethylene at 25° and 760 mm. pressure that would be required by Raoult's law, it will dissolve 6.8 times as much acetylene under the same conditions as that corresponding to Raoult's law.

The difference in solubility of acetylene and ethylene in triethyl phosphate is shown in the following table:

TABLE II

[Cc. of gas (S. T. P.) dissolved by one gram of triethyl phosphate at one atmosphere]

| Temperature, °C. | Acetylene | Ethylene |
|---|---|---|
| +5 | 34.4 | 2.26 |
| 25 | 19.9 | 1.82 |
| 40 | 12.9 | 1.41 |

The solubility of monovinyl acetylene in triethyl phosphate at 25° C. and one atmosphere pressure is approximately 205 cc. (S. T. P.) per gram of solvent.

The following examples are given to illustrate the various methods in which the solvents may be used in the absorption and storage of acetylene and the separation of acetylene and acetylenic compounds from other gases. These examples are given merely to illustrate the invention, and are not to be construed as limitations upon the invention.

EXAMPLE 1

*Use of triethyl phosphate as a storage solvent for acetylene*

100 volumes of triethyl phosphate is agitated and maintained at 25° C., while passing in acetylene until the liquid is saturated at atmospheric pressure. The solution will be found to contain approximately 2570 volumes of acetylene at 25° C. By heating the solution to 90° C., approximately 2000 volumes of acetylene (measured at 25° C.) will be recovered.

By increasing the acetylene pressure to 3000 mm. (absolute), it is possible to dissolve approximately 9200 volumes of acetylene (measured at 25° C., and 760 mm.) in the 100 volumes of triethyl phosphate at 25° C. and 6630 volumes may be recovered by simply releasing the pressure while the temperature is kept constant.

EXAMPLE 2

*Use of n-propyl phosphine oxide as a storage solvent for acetylene*

100 grams of tri-n-propyl phosphine oxide is melted and acetylene is passed into the stirred liquid while the temperature is gradually reduced at such a rate as to avoid solid formation. When the solution becomes saturated at 25° C., it will be found to contain 3.65 liters of acetylene (measured at 25° C., and 760 mm. pressure). By freezing the mixture and reducing the pressure to 650 mm., about one-third of the acetylene may be recovered. A further quantity may be recovered by reducing the pressure further. The acetylene may also be released, as in the previous example, by heating the solution instead of freezing it.

EXAMPLE 3

*Use of triethyl phosphate as a selective solvent for concentration of acetylene from mixtures*

Acetylene may be recovered from dilute mixtures by absorption in triethyl phosphate and stripping out at a higher temperature or lower pressure as follows: A mixture of the following composition:

61.8 volume percent $H_2$
5.3 volume percent $C_2H_4$
26.3 volume percent $C_2H_2$
6.6 volume percent methane and other non-acetylenic gases may be passed up through an absorption tower counter-current to a stream of triethyl phosphate at +5° C. The column operates at substantially atmospheric pressure, that is, the pressure at the top is 760 mm. While 95 parts of the mixed gases pass up the column, 2.17 parts by volume of triethyl phosphate enter the top of the column. The composition of the gas leaving the top of the tower will be found to be:

82.9 volume percent $H_2$
6.8 volume percent $C_2H_4$
1.4 volume percent $C_2H_2$
8.9 volume percent methane and other non-acetylenic gases.

The solution of gases is passed from the bottom of the absorber into a stripping column in which the liquid is heated to 90° C., and the pressure is reduced to 100 mm. The gas obtained from this stripper will be approximately 99 volume percent acetylene and about 1 volume percent ethylene. The stripped triethyl phosphate pumped from the bottom of the tower may be recycled to the absorber. It will contain 0.33 volume of $C_2H_2$ (measured at S. T. P.) per 2.17 volumes of solvent. Conventional use of a heat exchanger will increase the thermal efficiency of the operation.

If an acetylene of higher purity is required, the acetylene resulting from the first purification may be passed into a second absorber while 0.67 part of triethyl phosphate at +5° C. is passed into the top of the tower. About .001 volume of acetylene and almost all of the ethylene will escape from the top of the absorber. The solution of acetylene in triethyl phosphate may be passed into a stripper operating at 90° C., and 100 mm. from which acetylene is obtained that is sufficiently pure for most uses.

It will of course be understood that the absorption and desorption might be carried on at other temperatures and pressures; the figures recited are merely illustrative. The desorber may be operated at a lower temperature and correspondingly lower pressure, or at a higher temperature and correspondingly higher pressure with similar results, or, if a lower recovery of acetylene is acceptable, either the pressure of the desorber may be increased or the temperature decreased. The efficiency of the operation will depend upon the difference in solubility of acetylene in the solvent between conditions chosen for operation of the absorber and those chosen for the desorber.

If the feed gas contains any appreciable quantity of substances boiling above propane, they should be removed before passing the gas into the absorber, because, otherwise, a portion of the high boiling material will follow through the system and contaminate the product acetylene. Such removal can be accomplished in the usual known manner by chilling the gas or by scrubbing it with a small amount of an oil or other high-boiling solvent that is not selective for acetylenes.

In a similar manner, other acetylenic compounds may be absorbed with these efficient absorption compounds, or they may be separated from other types of gases with which they normally occur, by a similar absorption method.

The following example is given to illustrate the absorption of monovinyl acetylene in triethyl phosphate.

EXAMPLE 4

*Use of triethyl phosphate as storage solvent for monovinyl acetylene*

Monovinyl acetylene is absorbed in triethyl phosphate until the latter is saturated at 25° C. Approximately 239 cc. of monovinyl acetylene (measured at 25° C. and atmospheric pressure) are dissolved per gram of triethyl phosphate. By simply heating to 90° C., about 89% of the vinyl acetylene can be recovered. By slightly reducing the pressure, a further quantity can be recovered. This makes a safe and convenient method of storing monovinyl acetylene, without the necessity for using pressure equipment.

As indicated, the acetylenic compounds for which these solvents show a selective solvent action are those having an unsubstituted acetylenic hydrogen, that is, at least one hydrogen attached to a triply bound carbon.

The alkyl phosphates, alkyl phosphites, and the alkyl phosphine oxides which are particularly applicable for use in the present invention are those in which the alkyl chain contains from 1 to 4 carbon atoms.

We claim:

1. In a process for increasing the acetylenic gas content of gaseous mixtures containing acetylenic compounds of not more than 4 carbon atoms and which contain unsubstituted acetylenic hydrogen, the step which comprises selectively dissolving the acetylenic gas in a tri-alkyl phosphorus compound of the class consisting of tri-alkyl phosphates, tri-alkyl phosphites and tri-alkyl phosphine oxides in which each alkyl chain in each case contains from 1 to 4 carbon atoms.

2. In a process for increasing the acetylene content of gaseous mixtures containing the same, the step which comprises selectively dissolving the acetylene in a tri-alkyl phosphorus compound of the class consisting of tri-alkyl phosphates, tri-alkyl phosphites and tri-alkyl phosphine oxides in which each alkyl chain in each case contains from 1 to 4 carbon atoms.

3. In the process for recovering acetylene from mixtures of the same with ethylene and low boiling non-acetylenic gases, the step which comprises dissolving the acetylene out of the mixture with a tri-alkyl phosphorus compound of the class consisting of tri-alkyl phosphates, tri-alkyl phosphites and tri-alkyl phosphine oxides in which each alkyl chain in each case contains from 1 to 4 carbon atoms.

4. A composition comprising a solution of an acetylenic compound containing not more than 4 carbon atoms and an unsubstituted acetylenic hydrogen dissolved in a tri-alkyl phosphorus compound of the class consisting of tri-alkyl phosphates, tri-alkyl phosphites and tri-alkyl phosphine oxides in which each alkyl chain in each case contains from 1 to 4 carbon atoms.

5. A composition comprising a solution of acetylene dissolved in a tri-alkyl phosphorus compound of the class consisting of tri-alkyl phosphates, tri-alkyl phosphites and tri-alkyl phosphine oxides in which each alkyl chain in each case contains from 1 to 4 carbon atoms.

6. In a process for increasing the acetylenic gas content of gaseous mixtures containing acetylenic compounds of not more than 4 carbon atoms and which contain unsubstituted acetylenic hydrogen, the step which comprises selectively dissolving the acetylenic gas in a trialkyl phosphate in which each alkyl group contains from 1 to 4 carbon atoms.

7. In the process for recovering acetylene from mixtures of the same with ethylene and low boiling non-acetylenic gases, the step which comprises dissolving the acetylene out of the mixture with a trialkyl phosphate in which each alkyl group contains from 1 to 4 carbon atoms.

8. A composition comprising a solution of an acetylenic compound containing not more than 4 carbon atoms and an unsubstituted acetylenic hydrogen dissolved in a trialkyl phosphate in which each alkyl group contains from 1 to 4 carbon atoms.

9. A composition comprising a solution of acetylene dissolved in a trialkyl phosphate in which each alkyl group contains from 1 to 4 carbon atoms.

10. A composition comprising a solution of acetylene dissolved in triethyl phosphate.

RICHARD R. VOGT.
WILLIAM H. HAMILL.

REFERENCES CITED

The following references are of record in the file of this patent:

UNITED STATES PATENTS

| Number | Name | Date |
|---|---|---|
| 2,146,448 | Scott et al. | Feb. 7, 1930 |

FOREIGN PATENTS

| Number | Country | Date |
|---|---|---|
| 262,404 | Great Britain | Feb. 17, 1927 |